Dec. 17, 1963  R. S. YAROSZ  3,114,259

HARDNESS TESTER ANVIL

Filed June 7, 1961

INVENTOR.
ROMAN S. YAROSZ
BY
Gardner & Zimmerman
ATTORNEYS

United States Patent Office 3,114,259
Patented Dec. 17, 1963

3,114,259
HARDNESS TESTER ANVIL
Roman S. Yarosz, 725 Dutton, San Leandro, Calif.
Filed June 7, 1961, Ser. No. 115,338
3 Claims. (Cl. 73—81)

This invention relates generally to apparatus for testing the hardness of materials, and more particularly relates to an anvil used for supporting and retaining a specimen while being tested.

Hardness testing machines, such as a "Rockwell" hardness tester, operate, in general, by striking a specimen with a pointed penetrator, the point being of conical, spherical, or other shape, depending upon the particular application. Conventional means are utilized to measure the extent of penetration and a relative indication of hardness is obtained by correlating the depth of penetration with the predetermined force of impact.

To perform the test, a specimen is placed on top of an anvil, the penetrator being disposed in contact with the top of the specimen. The penetrator is then knocked downwardly into the specimen. Inasmuch as this test is performed with materials of various sizes and shapes, several types of anvils are needed, each anvil being designed to support a particular shape specimen. These anvils are interchanged within the machine by adapting the bottom of each with a cylindrical hub whereby the anvil is inserted with a slip fit into a vertically disposed tubular mounting sleeve.

The conventional means for supporting cylindrical and tubular rod specimens is an anvil having a V-shaped groove. Unfortunately, however, with very small diameter rods it is difficult to make the penetrator depress into the rod rather than slip off the side. This problem arises primarily because the anvil tends to shift laterally within the mounting sleeve, thus also shifting the rod with relation to the penetrator. Further difficulty is encountered when the rod tends to rotate in the anvil. It is noted that the smaller the rod diameter is, the greater the tendency is for the penetrator to be deflected without making a depression. Thus, in order to maintain the interchangeability of the anvils, there must be some play of the anvil within the mounting sleeve, and consequently it is not possible to position the conventional anvil with sufficient rigidity and accuracy to test very small rods. Another problem with the V-shaped groove anvil is that the rod specimen is supported, as viewed through a transverse section, at only two points. Hence, the downward force of the penetrator may cause the rod to deform into the groove whereby the measurement is erroneous in that it includes not only the penetration into the rod but the deformation as well.

It is accordingly a primary object of the invention to provide an anvil of the character described which maintains the penetrator in proper alignment with the specimen during the testing operation.

It is a further object of the invention to provide an anvil for retaining a small diameter rod while preventing the penetrator from slipping off the side of the rod.

It is another object of the invention to provide an anvil adapted to firmly support and retain a cylindrical or tubular rod specimen.

An even further object of the invention is to provide an anvil for supporting a rod specimen which prevents deformation of the rod from the force of the penetrator.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
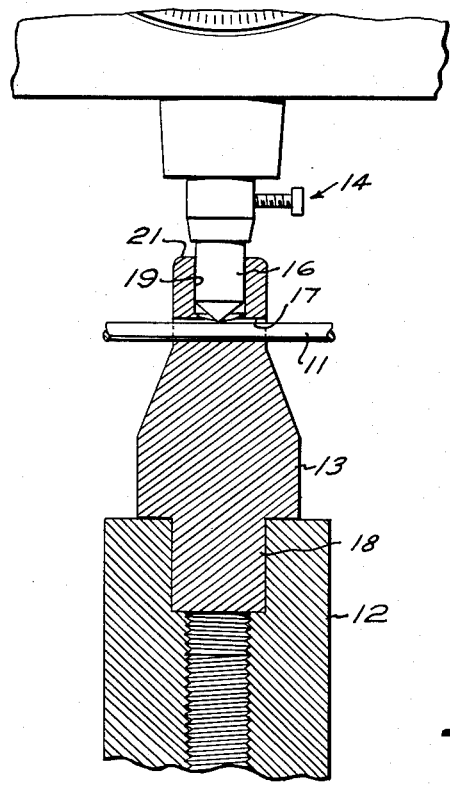
FIGURE 1 is an elevation view in section of a preferred embodiment of the invention.
Figure 2:
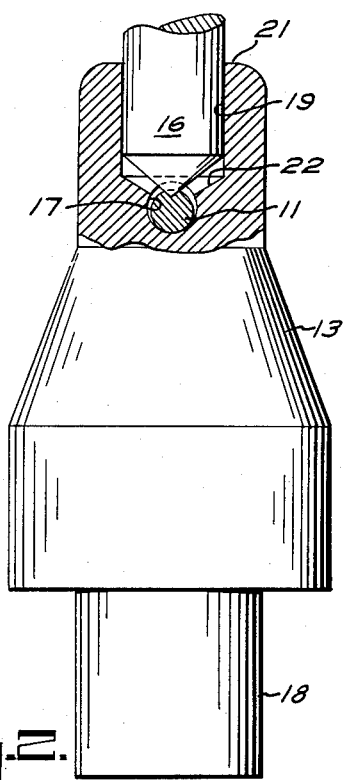
FIGURE 2 is an end view, in an enlarged scale, of the embodiment shown in FIGURE 1.

As hereinabove mentioned, the instant invention is adapted to retain and support a specimen rod, such as the rod 11 shown in the drawings, while the rod is tested for its relative hardness in a machine such as a "Rockwell" tester. In general, the testing apparatus comprises a vertically disposed tubular mounting sleeve 12 which is secured to a base member (not shown), the sleeve 12 being adapted to retain an anvil 13. A penetrator assembly 14 is disposed above the anvil 13 and includes a penetrator 16 which contacts the upper portion of the specimen rod 11 and can be depressed downwardly therein. With a conventional anvil, any shifting thereof within the mounting sleeve 12 would laterally displace the specimen rod 11 relative to the penetrator 16 thus causing the penetrator to slide off the rod and give an invalid measurement.

Now the present invention provides an anvil 13 having a horizontal passageway 17 therethrough which is adapted to receive the specimen rod 11, the anvil also being provided with a hub 18 which fits into the sleeve 12. To provide the required alignment of the penetrator, a vertical bore 19 is formed in the top 21 of the anvil 13 and is extended downwardly therein to intersect the horizontal passageway 17. By adapting the vertical bore 19 to receive the penetrator 16 with a slip fit, the penetrator is thereby maintained in a proper position directly above the rod 11, and any tendency of the anvil to shift within the mounting sleeve is rendered harmless by the guidance of the bore 19.

Figure 3:
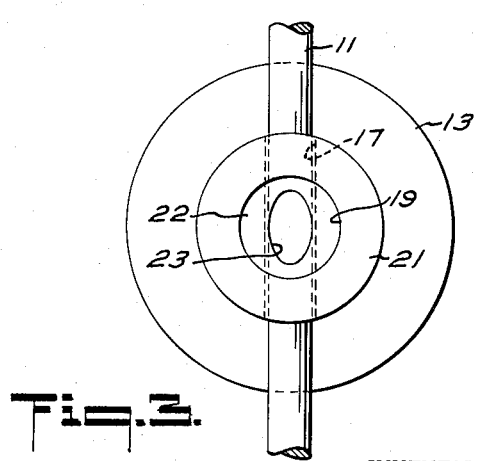
FIGURE 3 is a top view of the embodiment shown in FIGURE 2, with the penetrator removed.

To assure that the rod 11 does not twist while undergoing depression, the horizontal passageway 17 is adapted with a diameter only slightly larger than that of the specimen, the snug fit thus affording resistance to rotation. It is further noted that in its preferred form, the invention provides for the line of intersection of the vertical bore with the horizontal bore to be at all points above the center of the horizontal bore. More specifically, the bottom portion of the vertical bore 19 is provided with an inwardly and downwardly tapered sidewall 22 which intersects the horizontal bore 17 above a horizontal plane through its center, and forms an elliptical line of intersection 23 as seen in FIGURE 3. Consequently, the rod is encircled and supported underneath by greater than 180° of the bottom surface of the horizontal bore. The downward movement of the penetrator thus comprises only the depression into the rod, and there is no deformation of the rod into the anvil as could occur when the rod is supported by a V-shaped groove.

It is appreciated that in the preferred form of the invention, several anvils each having a different horizontal bore diameter would be required to accommodate a range of different size rods. However, note that the horizontal passageway is readily adapted with a V-shaped bottom should it become desirable to have one anvil to handle rods of varying size.

What is claimed is:

1. In a hardness testing apparatus having a base, an upwardly extending mounting sleeve connected to said base, and a downwardly extending penetrator assembly disposed above said sleeve in confronting relation therewith, the combination comprising a body member disposed between said sleeve and said assembly, and a downwardly extending hub substantially integrally connected to the bottom end of said member and adapted to fit snugly into said mounting sleeve to securely position said body member under said penetrator assembly, said member having a substantially horizontal bore therethrough adapted to receive a specimen rod of a slightly smaller diameter than said bore, said member having a substantially vertical bore in the top thereof.

2. An anvil used to retain a small diameter specimen rod for testing the hardness thereof in a hardness testing machine having an anvil mounting sleeve, comprising a body member formed for operative positioning on the anvil mounting sleeve of said machine, said body member having a substantially horizontal cylindrical bore therethrough in which the specimen rod is adapted to be firmly retained, said member having a substantially vertical bore in the top thereof extending downwardly therein to intersect said horizontal bore with the line of intersection of said bores at all points being above the center of said horizontal bore.

3. An anvil to be used with a hardness tester comprising a body member adapted for disposition under the penetrator assembly of said tester, said member having a substantially horizontal cylindrical bore therethrough adapted to retain a specimen rod of a slightly smaller diameter than said bore, said member having a vertical bore in the top thereof extending downwardly therein to intersect said horizontal bore thus providing access for a penetrator to engage said specimen, said vertical bore including an upper portion having a larger diameter than said horizontal bore, said vertical bore including a lower portion having an inwardly and downwardly tapered side wall intersecting said horizontal bore in a line of intersection at all points above the center line of said horizontal bore.

References Cited in the file of this patent

FOREIGN PATENTS

| | | |
|---|---|---|
| 387,542 | Germany | Dec. 29, 1923 |
| 897,628 | Germany | Nov. 23, 1953 |